Patented Dec. 27, 1932

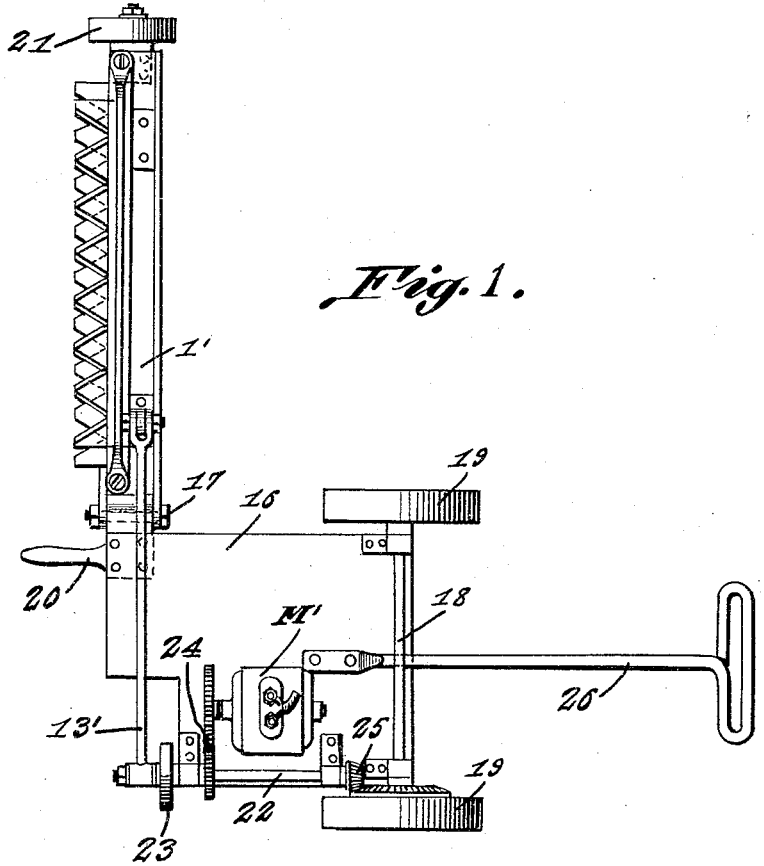
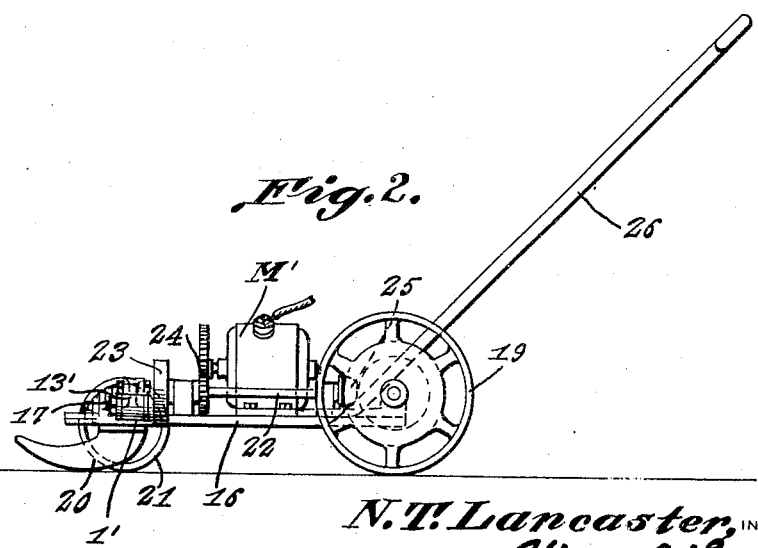

1,892,620

UNITED STATES PATENT OFFICE

NOAH T. LANCASTER, OF GASTONIA, NORTH CAROLINA

HEDGE AND LAWN MOWER

Application filed May 28, 1930. Serial No. 456,635.

This invention relates to a mower which may be used for cutting hedges, lawns and the like, the general object of the invention being to provide a reciprocatory cutting member operating over stationary blades or guards so that the device can cut material of any length and can readily pass under bushes and the like, with means for operating the reciprocatory member by a motor.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a top plan view showing the invention applied to a lawn mower.

Figure 2 is an elevation of Figure 1.

Referring to the drawing, therein is shown a lawn mower having the portion 1' which carries the cutting means and this portion is fastened to a platform 16 by the horizontal bolts 17 so that the member 1' and the cutting means carried thereby can move about a horizontal pivot.

The rear part of the platform supports a shaft 18 to which the ground wheels 19 are connected and a shoe 20 is connected with the front end of the platform so that the platform is supported by the ground wheels and said shoe. A small wheel 21 is arranged at the outer end of the member 1' to support the cutting means. A shaft 22 is rotatably supported by the platform and carries a crank disk 23, the crank pin of which is connected to the reciprocating member of the cutting means by the pitman 13'. The motor M' is supported by the platform and its shaft is connected with the shaft 22 by the gears 24. The shaft 22 may also be connected by the gears 25 with one of the ground wheels so that the motor will propel the device. The device can be guided by the handle 26 having its lower end connected with the platform.

Thus the motor propels the device and operates the reciprocating cutting member and if desired, the motor may be removed so that the reciprocating cutting member will be actuated from the ground wheels as the device is pushed along and the gear 25 can be removed so that the device can be propelled manually and the motor simply used for operating the reciprocatory member.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a lawn mower, a platform, wheels journaled at the rear end of the platform, a shoe at one forward corner of the platform, the other forward corner of said platform being cut away, a support projected laterally from the platform at the shoe corner thereof, a traction wheel at the outer end of said support, a hinge interposed between the platform and the support to permit vertical swinging movement of said support, a cutter operating in said support, and driven connections between the cutter and the wheels of the platform and having a power motor upon the support.

In testimony whereof I affix my signature.

NOAH T. LANCASTER.